(12) United States Patent
Salmela et al.

(10) Patent No.: US 8,047,332 B2
(45) Date of Patent: Nov. 1, 2011

(54) DIRECT GREASE INJECTION FOR LARGE OPEN GEARING

(75) Inventors: Gordon O. Salmela, Framingham, MA (US); Joseph A. Creonte, Wellesley Hills, MA (US)

(73) Assignee: Raytheon Company, Waltham, MA (US)

( * ) Notice: Subject to any disclaimer, the term of this patent is extended or adjusted under 35 U.S.C. 154(b) by 441 days.

(21) Appl. No.: 11/800,920

(22) Filed: May 8, 2007

(65) Prior Publication Data

US 2008/0276743 A1   Nov. 13, 2008

(51) Int. Cl.
*F16H 57/04* (2010.01)

(52) U.S. Cl. ........ 184/6.12; 184/6.3; 184/6.4; 184/6.11; 184/13.1; 74/438; 74/467; 74/468; 343/883; 384/493; 384/605; 384/905

(58) Field of Classification Search ............... 184/6.12, 184/109; 74/467, 468; 415/175; 409/69; 408/156–159; 475/159; *F03D 11/00; F16H 57/04; E02F 9/12*
See application file for complete search history.

(56) References Cited

U.S. PATENT DOCUMENTS

| | | | | |
|---|---|---|---|---|
| 1,176,936 A * | 3/1916 | Waldon | | 184/6.12 |
| 3,424,022 A * | 1/1969 | Greenberg et al. | | 74/409 |
| 3,822,607 A * | 7/1974 | Tharaldsen | | 74/468 |
| 4,271,928 A * | 6/1981 | Northern | | 184/6.4 |
| 4,573,373 A * | 3/1986 | Shimizu et al. | | 74/468 |
| 4,820,212 A | 4/1989 | McElroy et al. | | |
| 5,018,407 A * | 5/1991 | Hoecht | | 74/606 R |
| 5,622,239 A * | 4/1997 | Orlitzky | | 184/6.12 |
| 7,244,097 B2 * | 7/2007 | Hinz et al. | | 415/122.1 |
| 2003/0147751 A1* | 8/2003 | Wobben | | 416/174 |
| 2007/0095199 A1* | 5/2007 | Ogawa et al. | | 91/339 |

FOREIGN PATENT DOCUMENTS

WO   WO 2004101989 A1 * 11/2004

OTHER PUBLICATIONS

Dino Czichowski et al. "*Securing Green Wind Energy Production Through Centralized Lubrication*", Evolution, Willy Vogel AG, Hockenheim, Germany, evolution.skf.com, #3-2006, pp. 28-31.
Vogel "*SKF*", Willy Vogel AG, 2006 © SKF, 15 pages.

* cited by examiner

*Primary Examiner* — Robert Siconolfi
*Assistant Examiner* — San Aung
(74) *Attorney, Agent, or Firm* — Iandiorio Teska & Coleman (57) ABSTRACT

A drive gear includes a plurality of internal radial channels extending between the axial bore and the periphery of the gear, and an axial bore includes a lubricant distribution structure therein to provide lubrication where the teeth of the drive gear mesh with the teeth of a gear driven by the drive gear.

10 Claims, 10 Drawing Sheets

DIRECT GREASE INJECTION FOR LARGE OPEN GEARING

GOVERNMENT RIGHTS

This invention was made with U.S. Government support under Contract No. N00024-04-C-5340. The U.S. Government may have certain rights in the subject invention.

FIELD OF THE INVENTION

This subject invention relates to gears and gear lubrication.

BACKGROUND OF THE INVENTION

Some large gear drives are exposed to the environment and are not lubricated by circulating oil. Examples includes bull gears, girth gears, slew drive gears used for cranes, excavators, and other heavy equipment, gears used to rotate draw bridges, gears for ball mills, and also the final drive gear for steerable radar antennas on ships. Typically, a smaller pinion gear drives the large exposed gear.

Lubricating such gear drives with grease or another suitable lubricant is troublesome and messy. Sometimes, a brush is used to manually and periodically apply grease to the gear drive. Prior attempts at automatic grease applications resulted in waste and mess. When lubrication is ineffective, the result is wear of the gear drive. Moreover, even when the lubrication effort is effective, the result can be a waste of grease and/or grease contamination of adjacent equipment which, in the case of an antenna on board a ship, cannot be tolerated.

SUMMARY OF THE INVENTION

It is therefore an object of this invention to provide a new method of lubricating gear drives.

It is a further object of this invention to provide such a method which applies the lubricant only to the area needed.

It is a further object of this invention to provide such a method which minimizes the mess associated with prior lubrication schemes.

It is a further object of this invention to provide such a method which reduces wear.

It is a further object of this invention to provide such a method which eliminates the need to manually apply the lubricant.

The subject invention results from the realization that a more effective, automatic, less messy, and more precise lubrication of a bull, girth, slew drive, final drive, or other exposed gears is effected by configuring the gear which drives these gears with radial internal channels extending to the periphery of the drive gear to provide a lubricant such as grease to where the drive gear teeth mesh with the teeth of the bull, girth, slew drive, or final drive gear.

The subject invention, however, in other embodiments, need not achieve all these objectives and the claims hereof should not be limited to structures or methods capable of achieving these objectives.

This subject invention features, in one example, a drive (e.g., pinion) gear comprising a periphery including a plurality of spaced teeth. An axial bore includes a lubricant distribution structure therein. A plurality of internal radial channels extend between the axial bore and the periphery of the gear to provide lubrication where the teeth of the drive gear mesh with the teeth of a mating gear such as a girth, bull, slew drive, or final drive gear driven by the drive gear.

Typically, there is a radial channel in the drive gear in the space between each pair of adjacent gear teeth. In one version, the lubricant distribution structure includes a sleeve in the axial bore with an opening positioned to supply lubricant only to a radial channel or select channels in sequence as the drive gear rotates. Preferably, the opening is positioned to supply lubricant only to a radial channel or channels leading to a drive gear/driven gear mesh area.

The lubricant distribution structure may further include a hollow shaft in the sleeve for fixing the sleeve in place in the axial bore. The shaft may include at least one key and the sleeve includes at least one lock for the key. In one example, the shaft includes a first hexagon head and the sleeve receives the head in a hexagon opening. Also, the drive gear may include a cover. The shaft typically extends into the cover and includes a key received in a lock in the cover. The cover may include an anti-rotate plate with an axial channel therein in communication with the shaft. In one example, the shaft includes a second hex head locked within the anti-rotation plate. There may also be means for sealing the opening in the sleeve with respect to a radial channel in the bore such as a shoe on the sleeve biased into engagement with the bore.

A steerable antenna, in accordance with this invention, includes an antenna structure, a driven gear with exposed teeth for the antenna structure, and a drive gear. The drive gear has a periphery including a plurality of spaced teeth which mesh with the teeth of the driven gear, a lubricant distribution structure therein, and a plurality of internal radial channels extending between the lubricant distribution structure and the periphery of the drive gear to provide lubrication where the teeth of the drive gear mesh with the teeth of the driven gear.

The subject invention also features a method of lubricating a gear driven by a drive gear. An axial bore is formed in the drive gear and radial channels are formed in the drive gear extending between the axial bore and the periphery of the gear. A lubricant is driven into the axial bore and out of the drive gear through the radial channels to provide lubrication where the teeth of the drive gear mesh with teeth of the gear driven by the drive gear. A radial channel may be formed in the space between each pair of adjacent gear teeth. A sleeve can be inserted in the axial bore and has an opening positioned to supply lubricant only to a radial channel or select channels in sequence as the drive gear rotates. Typically, the opening is positioned to supply lubricant only to a radial channel or channels leading to a drive gear/driven gear mesh area. Typically, a hollow shaft is inserted in the sleeve for fixing the sleeve in place in the axial bore.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
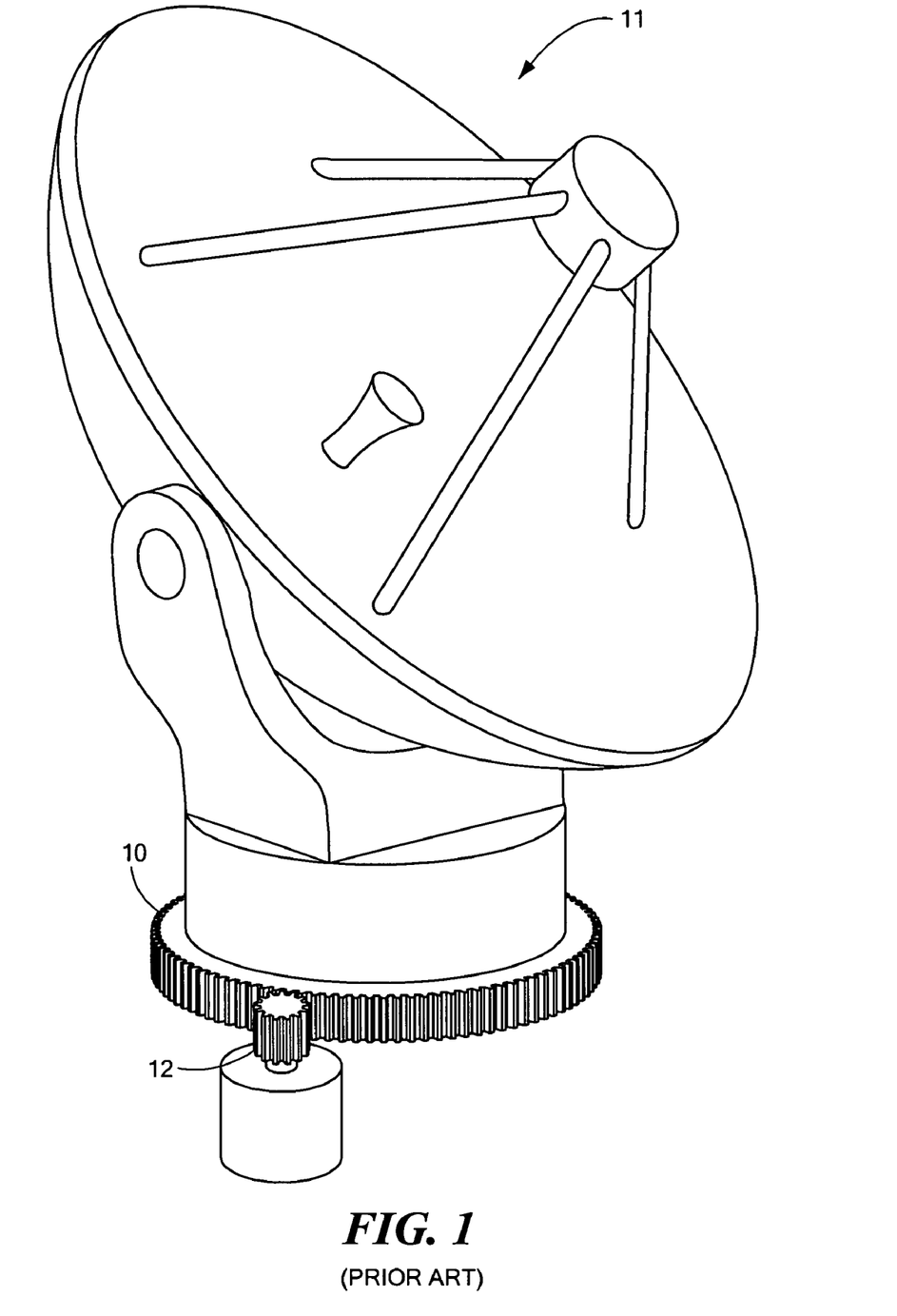
FIG. 1 is a highly schematic three-dimensional view showing an example of the final drive of a rotating steerable radar antenna structure driven by a pinion gear.

FIG. 1 schematically shows final drive gear 10 of rotating antenna structure 11. An example of antenna structure 11 includes Raytheon's (Waltham, Mass.) steerable radar systems. But, gear 10 may be any open gear such as a bull gear, girth gear, slew drive gear, and the like. Gear 10 is driven by drive gear 12 which, in this particular example, is a pinion gear.

As delineated in the Background section above, lubricating such gear drives is problematic. In the subject invention, drive gear 12, FIGS. 2-3 includes internal radial channels 14a-c, each of which terminates in the space or "root" between each pair of adjacent teeth 16a-d. Gear 12 also includes axial bore 18. Radial channels 14 extend from the periphery of gear 12 to axial bore 18 to provide lubricant where the teeth 16 of drive gear 12 mesh with the teeth of a gear (10, FIG. 1) driven by drive gear 12. Motorized pinion gear 12 is configured to drive gear 10 and as such is not merely a lubrication gear.

Figure 3:
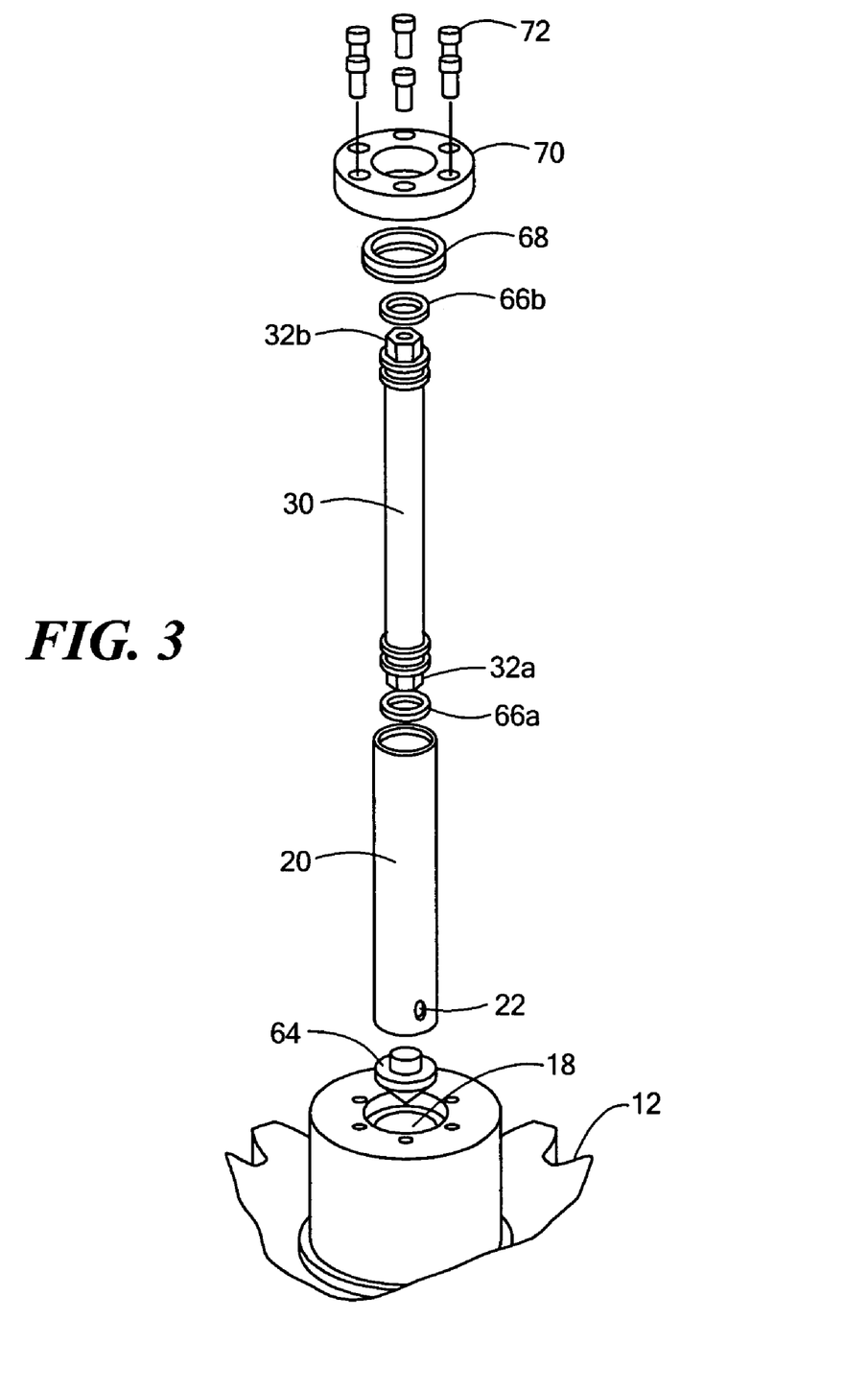
FIG. 3 is a schematic exploded three-dimensional view showing the primary components associated with the lubricant distribution structure located in the pinion gear shown in FIG. 2.
Figure 4:
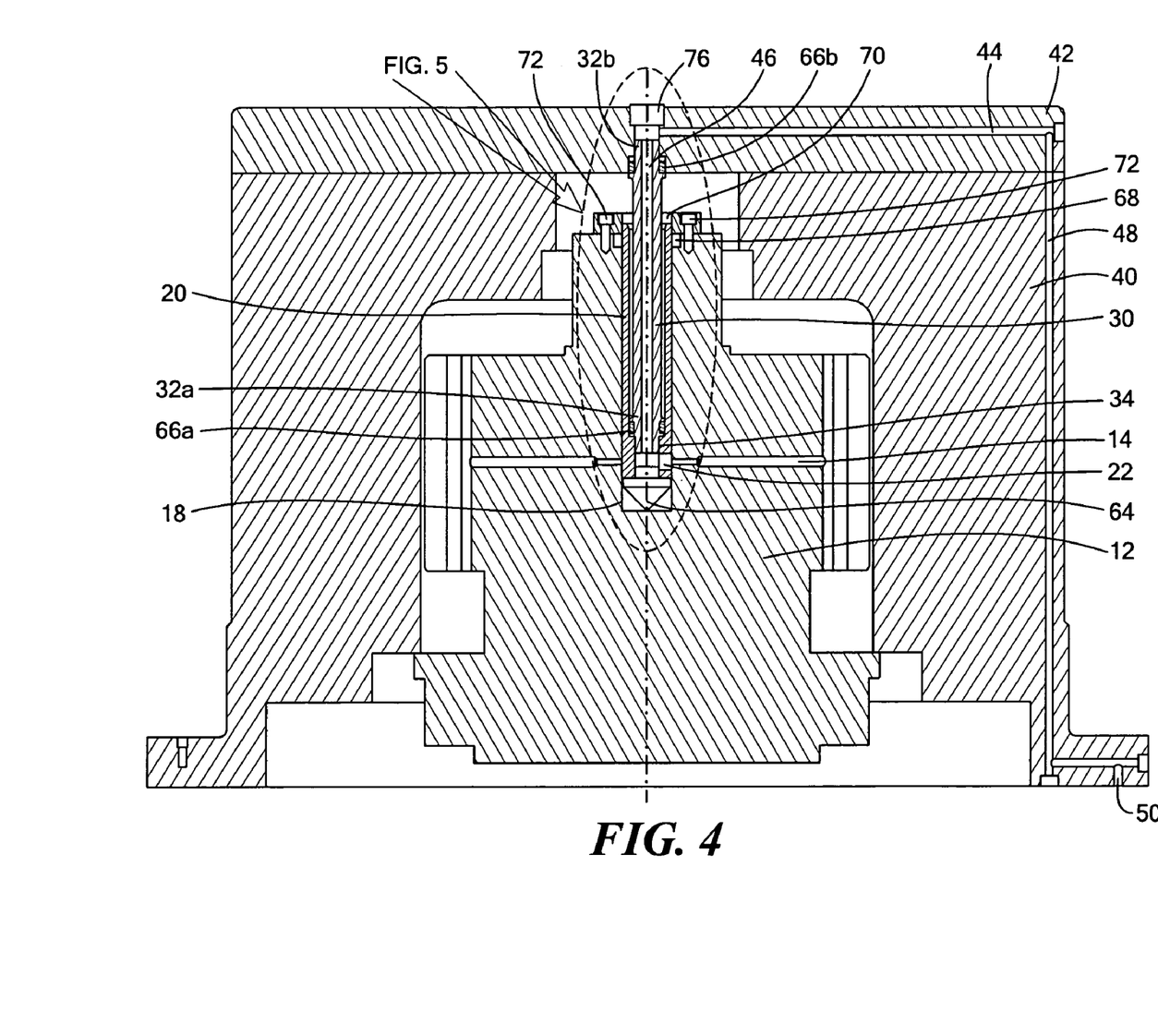
FIG. 4 is a schematic cross-sectional view showing the lubrication distribution structure of FIG. 3 in place in the pinion gear.
Figure 5:
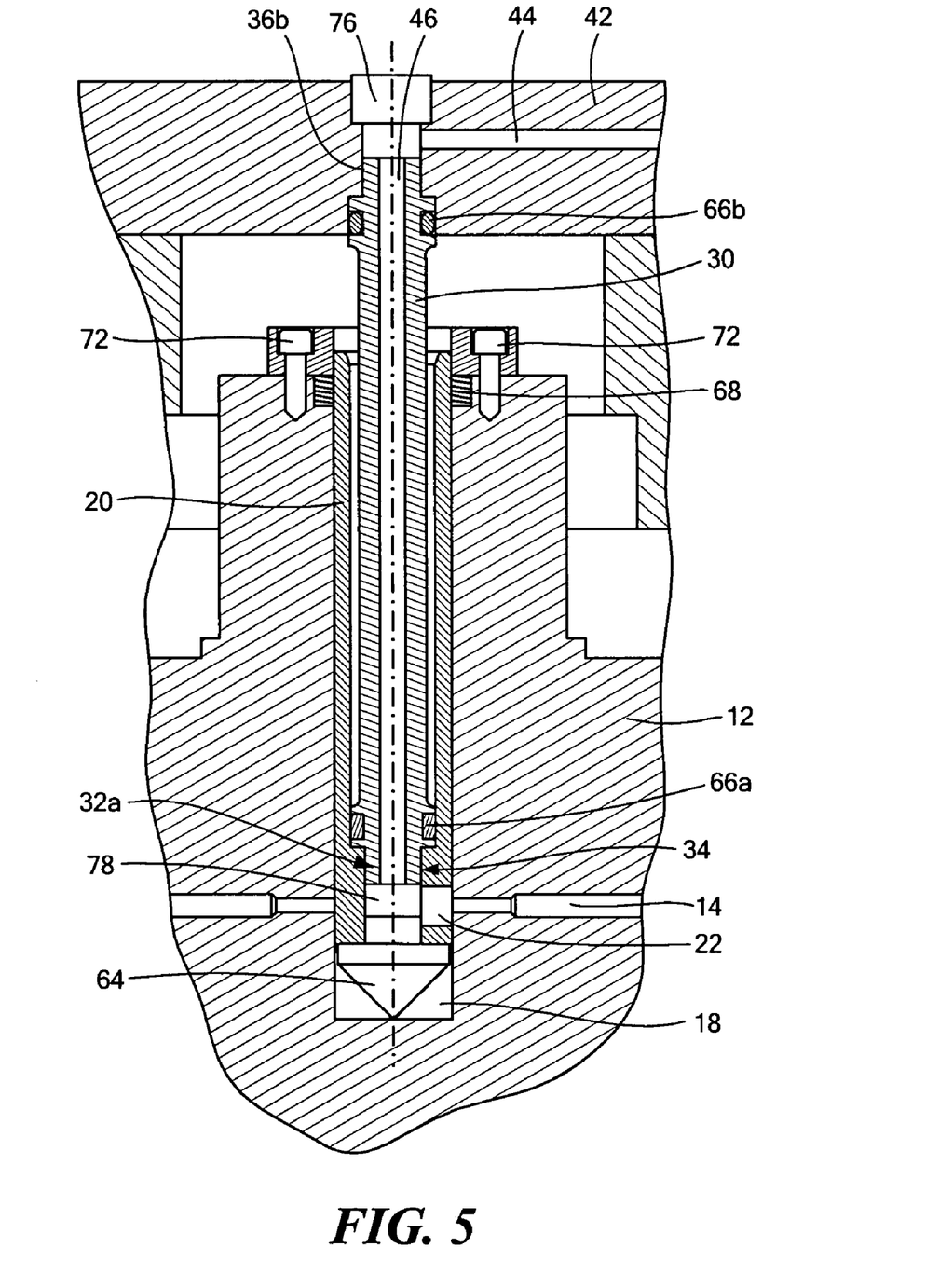
FIG. 5 is a schematic cross-sectional view showing in more detail the lubrication distribution structure shown in FIG. 4.

Preferably, bore 18 includes therein lubrication distribution structure. In this particular example, sleeve 20 is positioned in bore 18 and includes opening 22 positioned to supply lubricant only to a radial channel or select channels 14 in sequence as the drive gear 12 rotates. Opening 22 is positioned to supply lubricant only to a radial channel or channels 14 leading to a drive gear/driven gear mesh area as explained more fully in reference to FIG. 6, below. Thus, sleeve 20 does not rotate and hollow shaft 30 is designed to fix sleeve 20 in place in the axial bore 18. As shown in FIGS. 3-5, shaft 30 includes a key, e.g., male hex head 32a received in sleeve 20 hex shaped female lock portion 34. This structure prevents sleeve 20 from rotating relative to shaft 30. Shaft 30 extends into cover 40 (see also FIG. 2) which includes anti-rotation plate 42. Another hex head 32b on shaft 30 locks into female hex lock detail in plate 42, FIG. 4. Other key/lock configurations for preventing rotation of sleeve 20, however, are possible.

Plate 42 also includes channel 44 in communication with the axial channel 46 in shaft 30 and channel 48 in cover 40 which leads to injection port 50. Grease, typically pressurized by an automatic pump, is driven into injection port 50, through channel 48 in cover 40, through channel 44 in plate 42, down axial channel 46 in shaft 30, out opening 22 in sleeve 20, and into the particular internal radial channel or channels 14 presently aligned with opening 22. In this way, grease is provided to the mesh area where teeth 16, FIG. 6 of drive gear 12 contact teeth 26 of driven gear 10.

Figure 7:
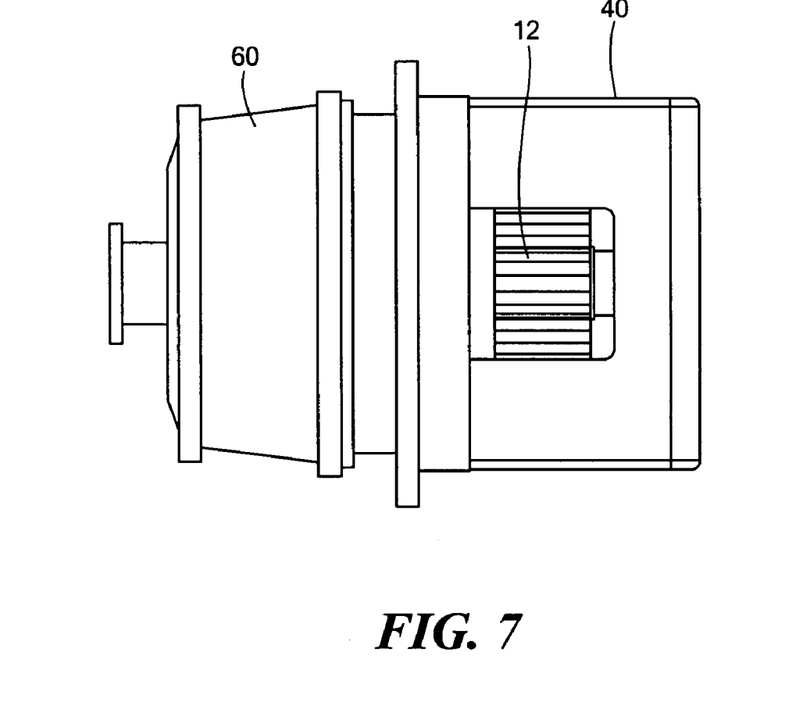
FIG. 7 is a schematic front view showing a complete pinion and gearbox in accordance with the subject invention.
Figure 8:
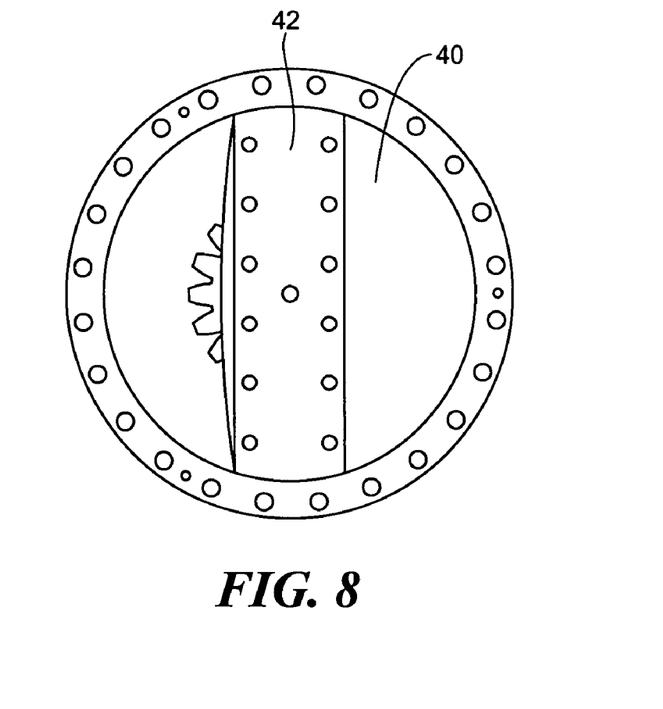
FIG. 8 is a schematic top view of the pinion and gearbox shown in FIG. 7.

In one particular example, referring again to FIGS. 2-3, low speed drive pinion gear 12 is turned by reduction gears in gearbox housing 60 driven by a motor. This pinion gear projects from the housing, typical in final drive gears ("bullgears") and the cantilevered, or "overhung", pinion bends elastically from tooth loads in operation. To reduce the resulting tilt angle, and thus improve the tooth load distribution along the length of each tooth, a common improvement is outboard bearing support (cover) 40. See also FIGS. 7-8.

Figure 2:
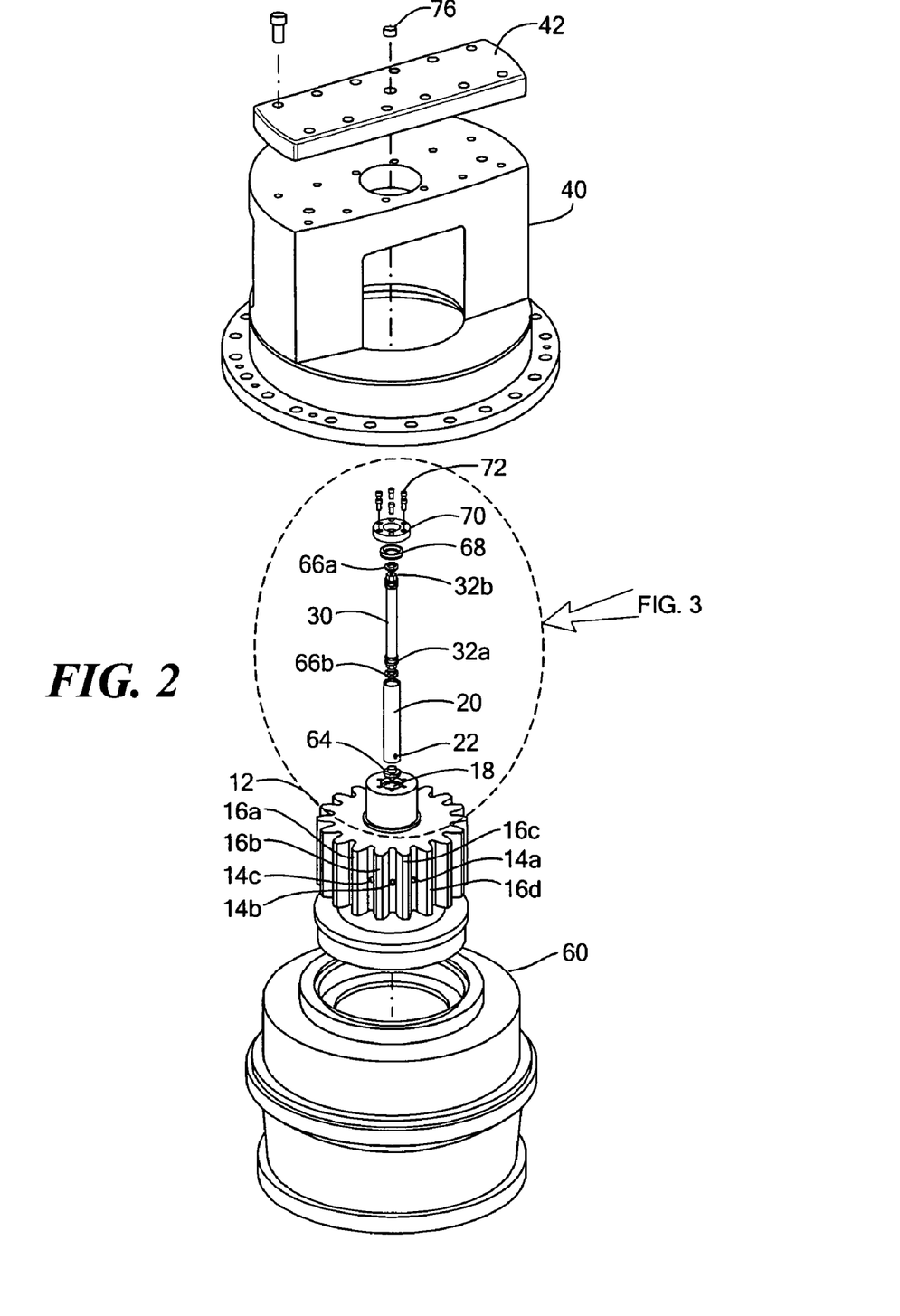
FIG. 2 is a schematic three-dimensional exploded view showing one particular example of a drive or pinion gear arrangement in accordance with the subject invention.

Thrust button 64, FIGS. 2 and 4 is located at the bottom of pinion gear central hole 18 to serve as a pivot point and to locate stationary sleeve 20 axially. Anti-rotate shaft 30 has hexagon heads 32a and 32b on both ends to engage the sleeve and prevent it from rotating when the pinion gear rotates around the sleeve. Grease is introduced to the sleeve through a central bore and anti-rotation shaft 30 and this grease path is sealed via two rubber O-rings 66a and 66b located in grooves near the ends of the shaft. Shaft 30 also serves to react the outward thrust generated by the hydraulic pressure of the grease, and thus keeps the sleeve in position axially. A grease seal 68 is fitted in the pinion gear counterbore to seal the outboard end of the sleeve. This seal is preferably of a high pressure design, spring energized, hydraulic U-cup style, and is held in the pinion gear by retainer 70 and screws 72.

FIG. 4 best shows the path of grease from the supply point 50 through the pinion and out into the gear mesh. To negotiate the outboard bearing support, drilled passageways have to make right-angle turns with the associated cross-drilling and plugging as required. The path continues out of the outboard bearing support 40 and into hole 44 in the anti-rotate plate 42 to cross over the pinion centerline. At this point, the path follows the central hole 46 in anti-rotate shaft 30 and down to the center of the pinion gear.

An oversize threaded plug 76 is used in anti-rotate plate 42 to allow a hexagon opening to be broached through the plate. This hexagonal hole, and a corresponding hexagon opening in sleeve 20 serve to lock sleeve 20 against rotation. The grease travels down central hole 46 in anti-rotation shaft 30 and enters the far end of sleeve 20. Here there is a cavity 78 with a single exit opening 22 in the plane of the plurality of drilled radial channels 14. These channels connect to all the spaces between the pinion gear teeth but only one is connected to exit opening 22 at any given time. The rest of the holes are blocked by the close fit (less than 0.001 inch diametrical clearance) of sleeve 20 to the central hole 18 in the pinion gear. Thus, grease is restricted to a single path from the supply point to the single radial channel which is aligned with the sleeve exit opening at that moment.

Figure 6:
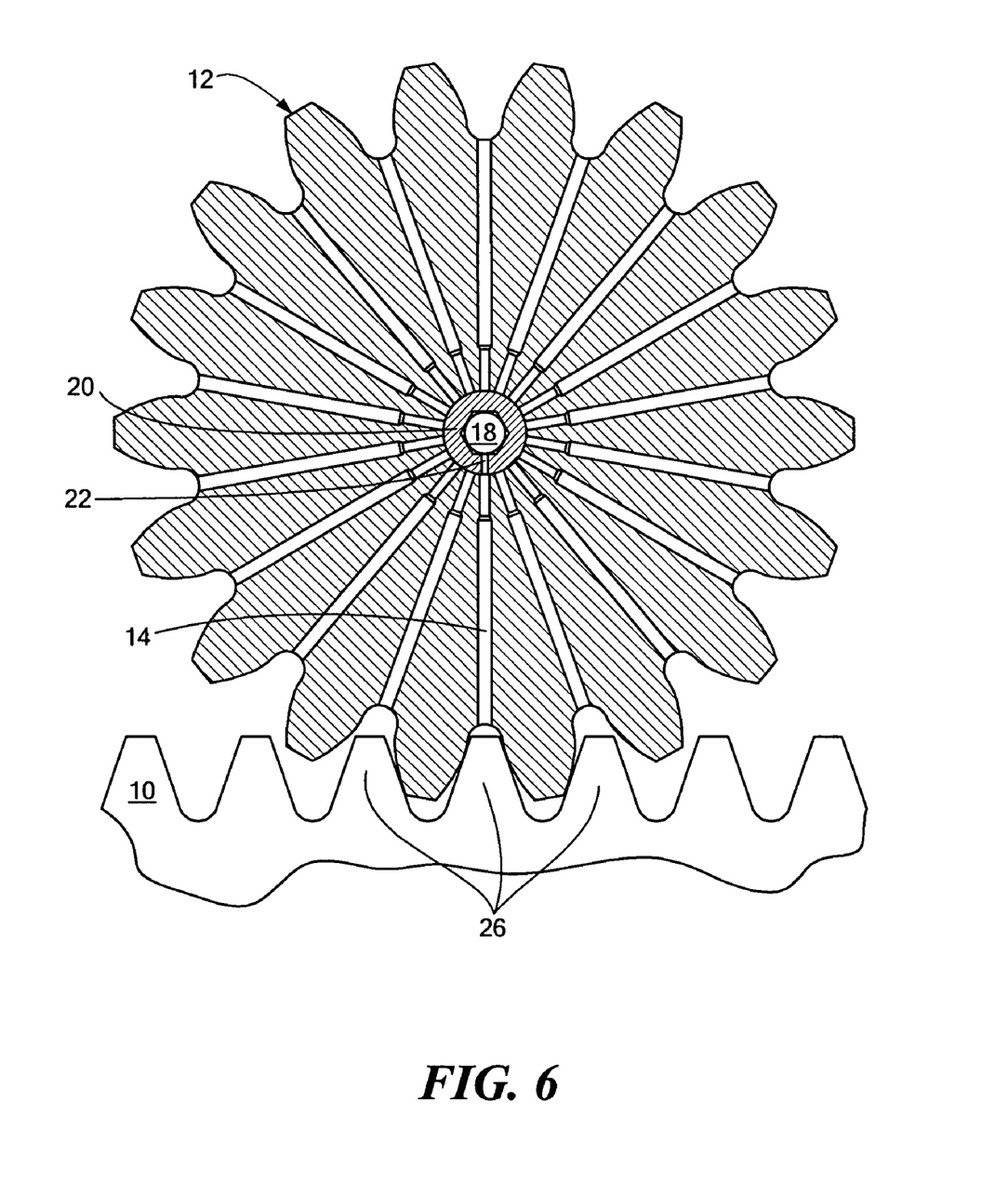
FIG. 6 is a schematic cross-sectional top view of an example of a pinion gear in accordance with the subject invention.

FIG. 6 shows the sleeve exit opening 14 oriented towards the mating gear 10. Thus, when grease is pumped into the gearbox, the only place it can go is directly into the point of meshing. Other radial holes are blocked off by the sleeve so no grease is wasted. This arrangement applies lubrication exactly where it is needed, especially in the case of tracking antennas, which may dither back and forth over small angles. If such dithering continues at length, gear damage can occur due to lubricant starvation. With other prior art methods of greasing the gears, it is not possible to refresh the lubricant at the point of meshing. Preferably, opening 22, FIG. 6 is large enough so that lubricant is never completely blocked by the absence of an escape path through a radial channel.

An additional benefit of the design disclosed above is reliability. If one passage of a typical distribution manifold becomes partially blocked, either by contamination or congealed grease, all the flow will go to the other outlets in the manifold. Lack of a flow through the blocked channel gives the blockage a chance to harden further.

However, in accordance with the subject invention, only one exit is used at a time, so any partial blockage will be driven out by the grease pump pressure and thus all channels will be kept open. The planned grease supply is typically a remote, electrically driven pump and reservoir that deliver timed pulses of grease to input port 50, FIG. 4 and can generate several thousand psi to overcome resistance from the friction in the connecting lines and partial blockages.

In other embodiments, however, the lubricant distribution structure may vary in design. Thus, the specific design of sleeve 20 and shaft 30 are presented here only as an example. Also, the number of and position of the radial channels internal to the gear may vary. In particular, a second set of radial channels each connecting to the tips of each pinion tooth tip could be drilled to deliver lubricant to the corresponding roots of the mating bullgear.

Figure 9:
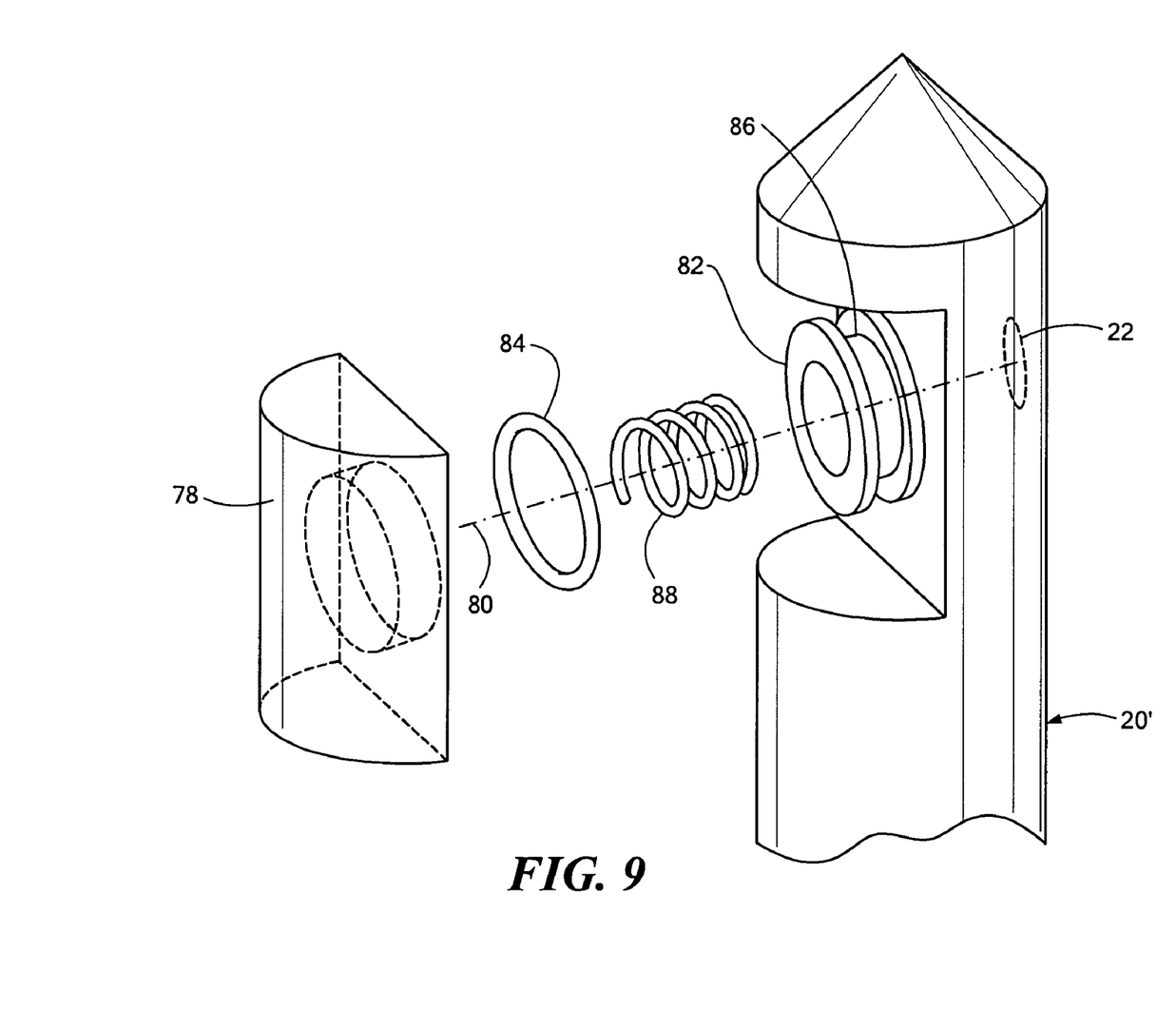
FIG. 9 is an exploded view of an example of a lubricant distribution sleeve with a pressure-balanced outlet in accordance with the subject invention.
Figure 10:
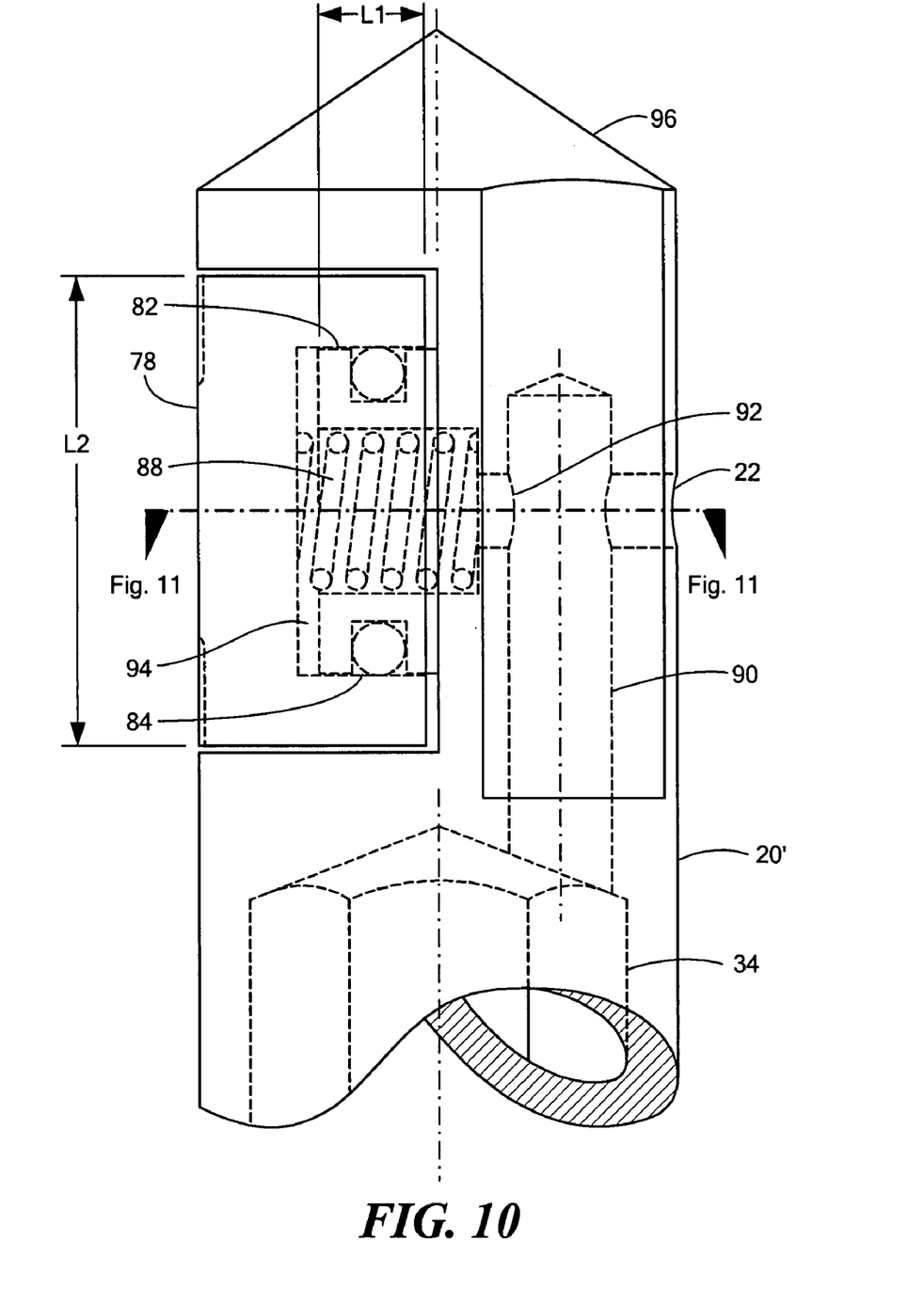
FIG. 10 is a side view of the distal end of the improved sleeve shown in FIG. 9.
Figure 11:
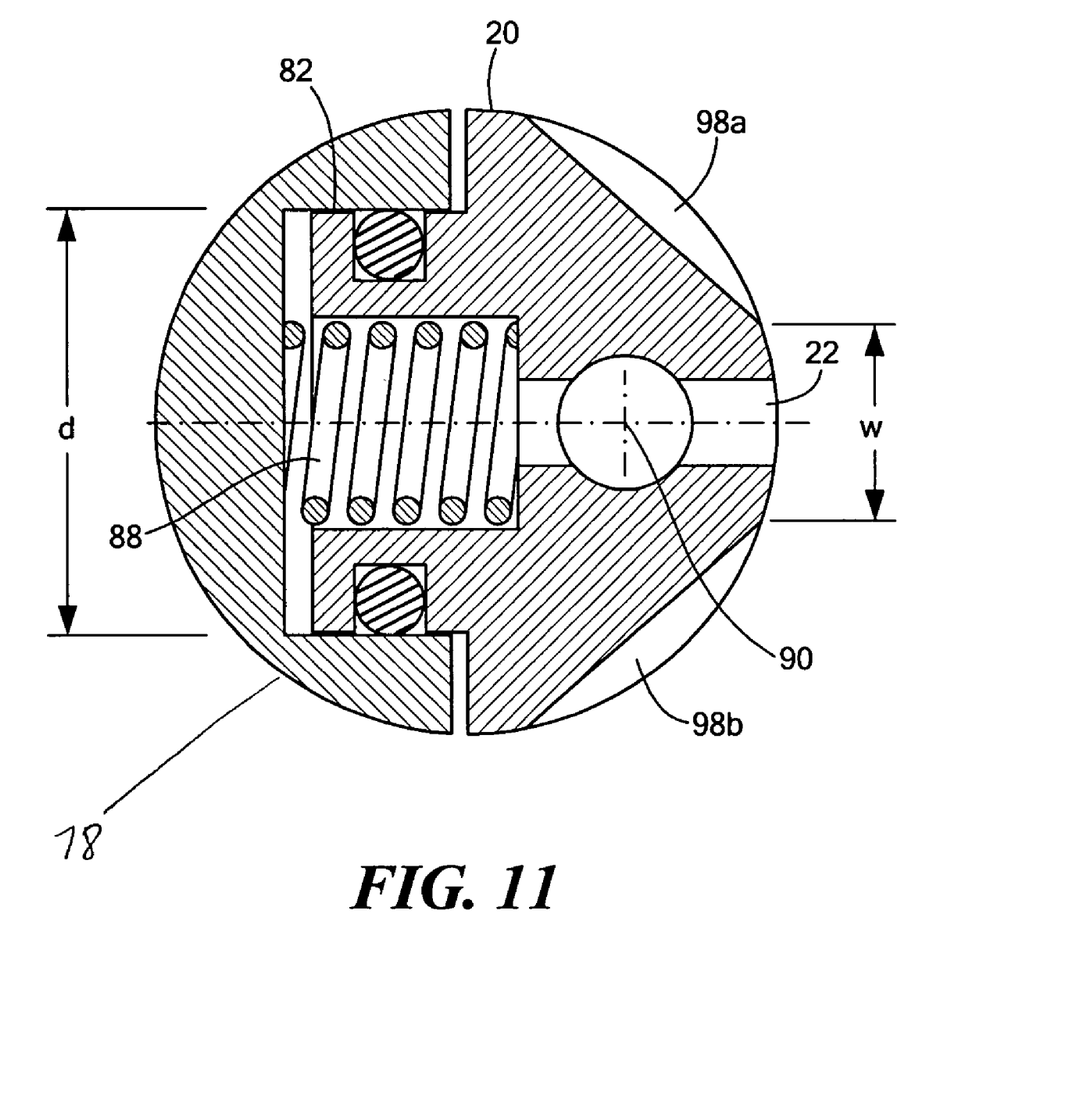
FIG. 11 is a cross-sectional view of the sleeve shown in FIG. 9.

In one design, opening 22, FIG. 4 in sleeve 20 may be actively sealed with respect to the bore 18 in driven gear 12. For example, a piston may be added opposite opening 22 and contact the wall of bore 18 under pressure from the grease. FIGS. 9-11 show an example of a suitable sealing arrangement.

FIG. 9 shows a variation of the distribution sleeve 20' with improved sealing means. In this embodiment, the portion of sleeve 20' opposite the outlet opening 22 includes shoe or piston 78. This piston is free to move along axis 80, perpendicular to the axis of sleeve 20. Shoe or piston 78 engages cylindrical boss 82 and is sealed with an O-ring or an equivalent seal 84 located in groove 86. The hydraulic pressure from the lubricant is thereby able to create an outward force along axis 80 without the grease escaping into unintended exit openings.

Pre-loading spring 88 is arranged to keep piston 78 extended and in light contact with the bore 18, FIG. 4. This pre-load thus forces the rest of sleeve 20', FIG. 9 in the opposite direction along axis 80 and serves to create an intimate contact of the area around outlet opening 22 with bore 18. Such intimate contact minimizes the leakage from opening 22 into bore 18 because the full amount of the diametral clearance between sleeve 20 and bore 18 (0.001 inch or less, as noted above) would otherwise be forced to appear around opening 20. This undesirable offset direction of sleeve 20 is the result of an unopposed hydraulic pressure in and immediately surrounding opening 22 when grease is being delivered. In this way, opening 22 mates with and seals with respect to a corresponding channel in bore 18, FIG. 5.

FIG. 10 shows a side view of the outboard end of the improved sleeve 20'. In this embodiment, the hexagon-keyed internal passage 34 of sleeve 20 does not pass through but terminates in smaller passage 90 connecting to both the outlet opening 22 and cross-drilled passage 92. Passage 92 feeds piston bore 94, sealed by O-ring 84 in boss 82. For this particular configuration, piston 78 is prevented from "jamming" by having engagement length "L1" at least 50% of piston length "L2". Since there is no hole fully through sleeve 20, thrust button 64 may be replaced with integral conical tip 96.

FIG. 11 shows a cross-section through the piston 78 of FIG. 10. Here, passage 90 can be seen to supply grease and its associated hydraulic pressure to outlet opening 22 and piston 78. Relief cuts, such as schematically as 98a and 98b, are made to sleeve 20 to reduce the area around outlet 22, over which hydraulic pressure can act. Remaining width "W" could be experimentally determined to almost balance the opposing forces from the piston 78 with its diameter "D" and said outlet opening 22. A minimal force bias is desirable to reduce rubbing contact and wear around outlet opening 22, as well as gear bore 18.

Since both hydraulic forces derive from grease pressure in a common path, forces will balance at any value of backpressure. A downstream blockage can create a high backpressure and resulting high opposed forces but in normal grease delivery, or idle periods, only preload spring 88 acts to keep piston 78 extended on boss 82 and ready to provide the improved sealing function.

Other configurations are possible to provide pressure-balanced sealing of outlet opening 22 and all provide the benefits of looser manufacturing limits on the clearance between bore 18 and sleeve 20 plus more tolerance of clearance increases due to wear in service.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A drive gear driving a driven gear, the drive gear comprising:
   a periphery including a plurality of spaced teeth meshing with teeth of the driven gear;
   an axial bore in the drive gear including a lubricant distribution structure therein including a sleeve fixed in the bore, the sleeve including an opening;
   a plurality of internal radial channels extending between the axial bore and the periphery of the drive gear and in fluid communication with the sleeve opening as the drive gear rotates to provide lubrication where the teeth of the drive gear mesh with the teeth of the driven gear; and
   means for sealing the opening in the sleeve with respect to a radial channel in communication with the axial bore.

2. The drive gear of claim 1 in which there is a radial channel in the space between each pair of adjacent gear teeth.

3. The drive gear of claim 2 in which the opening is positioned to supply lubricant only to a radial channel or channels leading to a drive gear/driven gear mesh area.

4. The drive gear of claim 2 in which the lubricant distribution structure further includes a hollow shaft in the sleeve for fixing the sleeve in place in the axial bore.

5. The drive gear of claim 4 in which the shaft includes at least one key and the sleeve includes at least one lock for the key.

6. The drive gear of claim 5 in which the shaft includes a first head and the sleeve lock receives the head.

7. The drive gear of claim 5 further including a cover for the drive gear and the shaft extends into the cover and includes a key received in a lock in the cover.

8. The drive gear of claim 7 in which the cover includes an anti-rotate plate with a channel therein in communication with the shaft.

9. The drive gear of claim 7 in which the shaft includes a second head locked within the anti-rotation plate.

10. The drive gear of claim 1 in which the means for sealing includes a shoe on the sleeve biased into engagement with the bore.

\* \* \* \* \*